United States Patent [19]

Kunze

[11] Patent Number: 5,179,481
[45] Date of Patent: Jan. 12, 1993

[54] MAGNETIC TAPE CASSETTE APPARATUS

[75] Inventor: Norbert Kunze, Ehringshausen, Fed. Rep. of Germany

[73] Assignee: U.S. Philips Corporation, New York, N.Y.

[21] Appl. No.: 727,397

[22] Filed: Jul. 5, 1991

Related U.S. Application Data

[63] Continuation of Ser. No. 343,982, Apr. 26, 1989, abandoned.

[30] Foreign Application Priority Data

Apr. 30, 1988 [DE] Fed. Rep. of Germany ... 8805726[U]

[51] Int. Cl.⁵ .............................................. G11B 5/008
[52] U.S. Cl. ...................................... 360/96.5; 360/96.6
[58] Field of Search ................. 360/93, 90, 96.1, 96.5, 360/96.6

[56] References Cited

U.S. PATENT DOCUMENTS

| | | | |
|---|---|---|---|
| 4,087,844 | 5/1978 | Takahashi et al. | 360/93 |
| 4,202,021 | 5/1980 | Nagase et al. | 360/96.5 |
| 4,402,024 | 8/1983 | Kato | 360/96.5 X |
| 4,539,610 | 9/1985 | Takai | 360/93 X |
| 4,568,990 | 2/1986 | Ueno et al. | 360/96.5 X |
| 4,609,955 | 9/1986 | Sims, Jr. | 360/93 |
| 4,612,591 | 9/1986 | Tanaka | 360/93 X |
| 4,623,945 | 11/1986 | Deutsch et al. | 360/93 |
| 4,626,939 | 12/1986 | Takai et al. | 360/96.5 |
| 4,628,381 | 12/1986 | Takai | 360/93 X |
| 4,751,593 | 6/1988 | Yoshimura | 360/96.5 X |
| 4,802,037 | 1/1989 | Tanaka et al. | 360/93 X |
| 4,805,044 | 2/1989 | Otsuki | 360/137 |
| 5,023,742 | 6/1991 | Kunze | 360/137 |

Primary Examiner—A. J. Heinz
Assistant Examiner—Alfonso Garcia
Attorney, Agent, or Firm—Brian J. Wieghaus

[57] ABSTRACT

The invention relates to a magnetic-tape cassette apparatus (1), comprising a deck for playing magnetic-tape cassettes, which deck includes a cassette-loading mechanism including a lift lever (3) which enables a cassette holder (1) containing a cassette (3) to be moved between an eject position and a play position, a cassette driver (9) being guided in a slotted a guide in the lift lever 3 so as to be movable in the loading direction of the cassette holder 1a between a take-over position and a loading position and the cassette holder (1a) being in the lifted eject position when the cassette driver (9) is in the take-over position. The cassette driver (9) comprises resilient arms (26) which press against the lift lever (3) in the take-over position.

9 Claims, 1 Drawing Sheet

U.S. Patent
Jan. 12, 1993
5,179,481
Fig.1
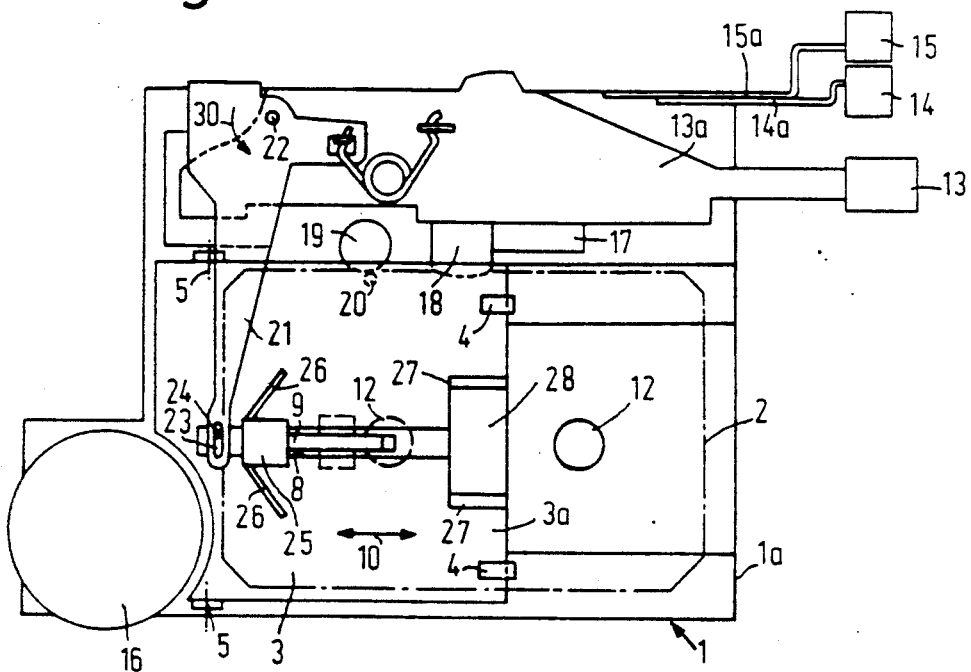
Fig.2
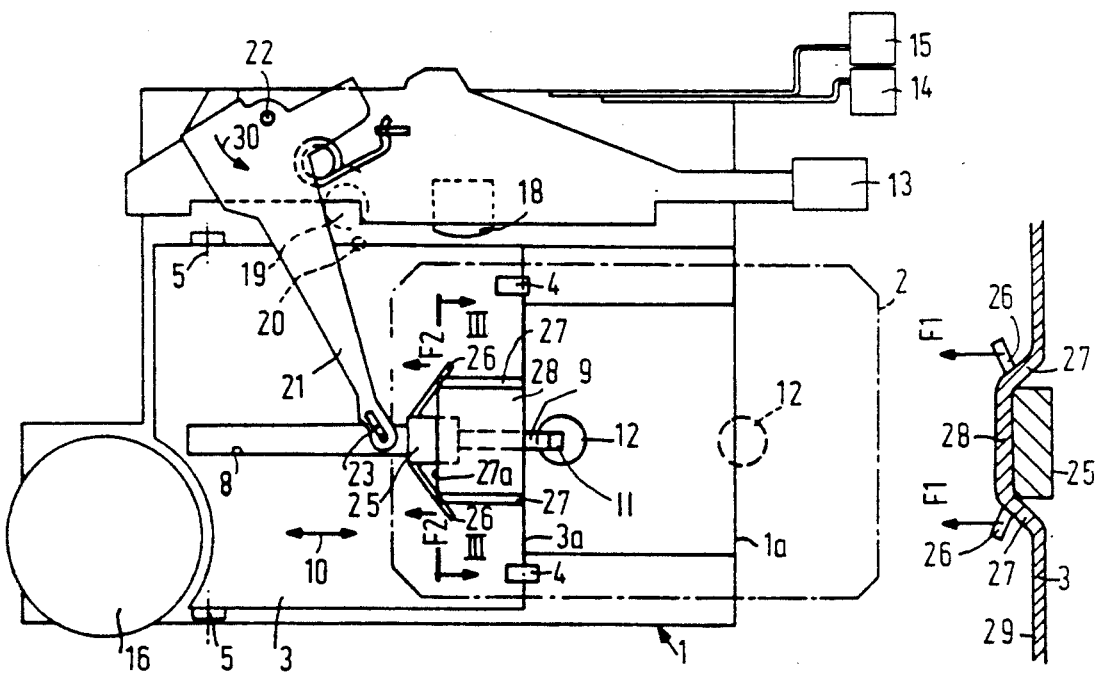
Fig.3

MAGNETIC TAPE CASSETTE APPARATUS

This is a continuation of application Ser. No. 07/343,982 filed Apr. 26, 1989, now abandoned.

BACKGROUND OF THE INVENTION

1. Field of the Invention

The invention relates to a magnetic-tape-cassette apparatus, comprising a tape deck for playing a magnetic-tape cassette, which deck comprises a cassette-loading mechanism which by means of a lift lever enables a cassette holder containing a cassette to be moved between an eject position and a play position, a cassette driver being guided in guide means of the lift lever so as to be movable in the loading direction of the cassette holder between a take-over position and a loading position, and the cassette holder being in the lifted eject position when the cassette driver is in the take-over position.

2. Description of the Related Art

Decks of magnetic-tape-cassette apparatuses comprise a cassette holder into which a cassette is inserted by hand. The cassette rests loosely in the cassette holder when it has not yet been engaged by the cassette-loading means or when it has been returned into the eject position by the cassette-loading means after playing.

The loading mechanism of a magnetic-tape-cassette apparatus comprises a lift mechanism by means of which the cassette holder in which a cassette has been inserted can be lowered from the eject position into the play position and from this position back into the eject position. Lowering and lifting of the cassette holder is effected with the aid of a lift lever, which is pivotable about the horizontal axis and whose front end is pivotally but loosely coupled to the cassette holder. The lift lever can be lowered or raised by means of a control rod and a cam surface which cooperates with an actuating element of the lift lever.

In its swung-down position the free end of the lift lever is pressed against the cassette holder. In the lifted position, when the cassette holder is in the eject position, the co-operating pivotal parts of the cassette holder and the lift lever extend substantially parallel to each other. A cassette driver is guided in the lift lever so as to be movable in the loading direction. This cassette driver comprises a projection which is engageable in a hub bore of a cassette. By moving the cassette driver forwards or backwards the cassette can be drawn into the cassette holder or pushed out of said holder. This longitudinal movement is obtained by means of actuating lever.

The cassette driver, which is generally an injection-moulded plastics part, must be guided in the lift lever with comparatively large tolerances. As a result of this, the cassette driver is fully clear of the lift lever in the eject position and may rattle against the cassette holder and the lift lever in the event shocks.

SUMMARY OF THE INVENTION

It is the object of the invention to preclude rattling of the loading mechanism of a magnetic-tape-cassette apparatus by means of a small number of simple parts.

According to the invention this object is achieved in that the cassette driver comprises resilient arms which press against the lift lever in the take-over position.

In this construction the resilient arms of the cassette driver are pressed against the lift lever, thereby immobilising the cassette driver relative to the lift lever. As a result of this, no rattling noise is produced because the parts no longer have any clearance relative to one another.

In a further embodiment of the invention the cassette driver extends along projecting portions of the lift lever which are inclined relative to the main surface of the lift lever and the resilient arms press against edges of said portions. By means of the projecting portions, which are inclined relative to the main surface of the lift lever, the parts are immobilised more effectively relative to one another.

In a further embodiment of the invention an actuating lever urges the cassette driver and the resilient arms against the edges of the projecting portions in the take-over position. The pressure of the actuating lever amplifies the clamping effect provided by the spring arms.

In a further embodiment of the invention the cassette driver and its resilient arms press against the projecting portions in opposite directions. Thus, the lift lever is substantially clasped between the cassette driver and the spring arms. This leads to a highly rattle-free construction.

In a further embodiment of the invention the projecting portions comprise offset strip portions underneath which the cassette driver extends. The inclined projections can be formed very simply by means of such offset strips.

In a further embodiment of the invention the cassette driver together with its resilient arms is constituted by an injection-moulded plastic part.

BRIEF DESCRIPTION OF THE DRAWINGS

The invention will now be described in more detail, by way of example, with reference to the accompanying drawing. In the drawing:

FIG. 1 shows a magnetic-tape-cassette apparatus comprising a loading mechanism and a lift lever in the play position, resilient arms of a cassette driver being provided to preclude rattling, FIG. 2 shows the magnetic-tape-cassette apparatus of FIG. 1 in the eject or unloading position, FIG. 3 is an enlarged scale sectional view taken on the line III—III in FIG. 2, to illustrate the co-operation between the cassette driver, the spring arms of the cassette driver, and an offset strip of the lift lever.

DETAILED DESCRIPTION OF THE PREFERRED EMBODIMENT

The magnetic-tape-cassette apparatus 1 shown in simplified form in FIG. 1 comprises a cassette holder 1a, in which a Compact Cassette has been inserted. The cassette holder 1a can be lowered by means of a lift lever 3 in a direction perpendicular to the plane of the drawing, the front end 3a of said lift lever engaging underneath coupling projections 4 of the cassette holder 1. The lift lever 3 is pivotable about an axis 5. The lift lever 3 is formed with a slotted guide 8, in which a strip-shaped cassette driver 9 is movable in the directions indicated by a double arrow 10. At one of its ends the cassette driver 9 has a projection 11 which engages in a hub bore 12 of the magnetic tape cassette 2. Keys 13, 14 and 15 comprising actuating rods 13a, 14a and 15a are provided for the tape-deck functions. All the movements of the deck are produced by means of a motor 16.

A head mounting plate 17 carries a magnetic head 18 and a pressure roller 19. The pressure roller 19 co-operates with a capstan 20.

Further, an actuating lever 21 is pivotable about a spindle 22. A slot 23 in the free end portion of the actuating lever 21 is engaged by a pin 24 of the cassette driver 9. The projection 11 of the cassette driver 9 then engages in one of the hub bores 12 of the cassette and retains the cassette in the drawn-in position. The cassette driver 9 extends over the guide 8 with a block 25 on which two resilient arms 26 are moulded. The cassette driver 9 with the block 25 and the resilient arms 26 form an integrated injection-moulded plastics part.

In the situation shown in FIG. 1 the cassette holder 1a is lowered in the play position and in FIG. 2 it is lifted by a pivotal movement of the actuating lever 21 in the direction indicated by an arrow 30, so that the cassette 2 is in its take-over or eject position. The cassette driver 9 has been moved into the eject position by the actuating lever 21 via the pin 24, so that the cassette 2 is also moved to this position. In the situation shown in FIG. 1 the cassette holder 1a is lowered, the front end 3a of the lift lever 3 being in its lowered position, but in the situation illustrated in FIG. 2 the cassette holder 1a is in the lifted position and the cassette holder 1a and the lift lever 3 extend generally parallel to one another in parallel planes. In the situation illustrated in FIG. 2 the resilient arms 26 engage against inclined edge portions 27a of a strip 28 which is offset from the lift lever 3 and which partly engages underneath the cassette driver during the displacement. The resilient arms immobilise the lift lever 3 relative to the cassette driver 9.

FIG. 3 is a sectional view taken on the line III—III in FIG. 2, showing how the cassette driver and the lift lever 3, or the offset strip 28 on this lever, are immobilised relative to one another. The block 25 presses against the strip 28 from underneath and the resilient arms 26 press against the inclined edge portions 27 of the strip 28 from the top. As a result of this pressure is exerted from two sides. Thus, the lift lever 3 is immobilised relative to the cassette driver and the cassette holder by its main surface 29 which engages underneath the coupling projections 4 of the cassette holder 1a, thereby precluding rattling. The clamping forces are designated $F_2$ in FIG. 2 and $F_1$ in FIG. 3.

I claim:

1. A magnetic tape cassette apparatus having a tape deck for playing a magnetic tape cassette, said deck including a cassette loading mechanism having a lift lever for receiving the cassette in a cassette takeover position, said lift lever being movable between an eject position and a play position and including guide means, and a cassette driver guided in said guide means and engageable with the cassette for moving the cassette within said lift lever between said take-over position and a loaded position, said lift lever being in the eject position when the cassette driver is in said take-over position, wherein the improvement comprises:
    said cassette driver including a resilient arm resiliently pressing against said lift lever in said take-over position of said cassette driver for resiliently immobilizing said cassette driver against said lift lever;
    whereby rattling noises which otherwise might be produced by said lift lever as a result of shock forces are substantially precluded.

2. A magnetic-tape-cassette apparatus as claimed in claim 1 characterized in that said lift lever includes a projecting portion inclined relative to a main surface of said lift lever and including a side edge, and in that said resilient arm presses against said side edge of said inclined portion.

3. A magnetic-tape-cassette apparatus as claimed in claim 2, further comprising an actuating lever which urges said cassette driver and said resilient arm against said side edge of said projecting portion in said take-over position of said cassette driver.

4. A magnetic-tape-cassette apparatus as claimed in claim 3, characterized in that said cassette driver includes a block disposed on the opposite side of said projecting portion from said resilient arm, said block and said resilient arm pressing against said projecting portion of said lift lever in opposite directions.

5. A magnetic-tape-cassette apparatus as claimed in claim 4, characterized in that said projecting portion comprises an offset strip portion underneath which said cassette driver extends.

6. A magnetic-tape-cassette apparatus as claimed in claim 1, characterized in that said cassette driver together with its resilient arm is constituted by an injection-moulded plastics part.

7. A magnetic-tape-cassette apparatus as claimed in claim 1, further comprising an actuating lever which urges said cassette driver and said resilient arm against said lift lever in said take-over position of said cassette driver.

8. A magnetic-tape-cassette apparatus as claimed in claim 7, characterized in that said cassette driver includes a block disposed on the opposite side of said lift lever from said resilient arm, said block and said resilient arm pressing against said lift lever in opposite directions.

9. A magnetic-tape-cassette apparatus as claimed in claim 8, characterized in that said lift lever comprises an offset strip portion underneath which said cassette driver extends.

* * * * *